(12) United States Patent
Saleh et al.

(10) Patent No.: US 9,106,157 B2
(45) Date of Patent: Aug. 11, 2015

(54) METHOD FOR GENERATING SWITCHING SIGNALS FOR A THREE PHASE SIX PULSE INVERTER

(76) Inventors: Saleh A. M. Saleh, St. John's (CA);
Azizur Rahman, St. John's (CA);
Cecilia Rose Moloney, St. John's (CA)

( * ) Notice: Subject to any disclaimer, the term of this patent is extended or adjusted under 35 U.S.C. 154(b) by 1022 days.

(21) Appl. No.: 13/116,870

(22) Filed: May 26, 2011

(65) Prior Publication Data

US 2012/0300513 A1  Nov. 29, 2012

(51) Int. Cl.
*H02M 1/08* (2006.01)
*H02M 7/5387* (2007.01)
*H02M 1/084* (2006.01)

(52) U.S. Cl.
CPC .................................. *H02M 7/53875* (2013.01)

(58) Field of Classification Search
USPC ............. 363/17, 40, 41, 55, 56.01, 56.02, 97,
363/98, 128, 131, 132, 133, 134, 163, 165
See application file for complete search history.

(56) References Cited

U.S. PATENT DOCUMENTS

| | | | | |
|---|---|---|---|---|
| 3,819,992 A | * | 6/1974 | Opal et al. | 318/798 |
| 3,845,372 A | * | 10/1974 | Ringland et al. | 318/779 |
| 3,958,171 A | * | 5/1976 | Sekino | 363/41 |
| 4,066,938 A | * | 1/1978 | Turnbull | 318/803 |
| 4,719,557 A | * | 1/1988 | Forstbauer et al. | 363/79 |
| 4,772,996 A | * | 9/1988 | Hanei et al. | 363/41 |
| 4,788,485 A | * | 11/1988 | Kawagishi et al. | 318/811 |
| 4,812,669 A | * | 3/1989 | Takeda et al. | 307/105 |
| 5,172,329 A | * | 12/1992 | Rahman et al. | 700/293 |
| 5,212,629 A | * | 5/1993 | Jessee | 363/42 |
| 5,969,966 A | * | 10/1999 | Sawa et al. | 363/163 |
| 5,978,633 A | * | 11/1999 | Hirsch et al. | 399/266 |
| 6,058,031 A | * | 5/2000 | Lyons et al. | 363/67 |
| 6,163,019 A | * | 12/2000 | Green et al. | 219/660 |
| 6,828,919 B1 | * | 12/2004 | Gold | 340/870.29 |
| 7,768,800 B2 | * | 8/2010 | Mazumder et al. | 363/17 |
| 7,834,579 B2 | * | 11/2010 | Nojima | 318/801 |
| 7,978,483 B2 | * | 7/2011 | Mazzola et al. | 363/17 |
| 8,169,107 B2 | * | 5/2012 | Hammond et al. | 307/52 |
| 8,321,134 B2 | * | 11/2012 | Al-Saleh | 702/17 |

\* cited by examiner

*Primary Examiner* — Adolf Berhane
*Assistant Examiner* — Nusrat Quddus
(74) *Attorney, Agent, or Firm* — Hereskin & Parr LLP/S.E.N.C.R.L., s.r.l.

(57) ABSTRACT

This invention relates to a method for generating switching signals for inverters using wavelet basis functions as a means to determine switching times, pulse duration, shifting and scale; and to a three phase, six pulse wavelet modulated inverter employing the method as a switching technique.

6 Claims, 7 Drawing Sheets

PRIOR ART

METHOD FOR GENERATING SWITCHING SIGNALS FOR A THREE PHASE SIX PULSE INVERTER

FIELD OF INVENTION

The present invention relates to an apparatus and methods for converting of direct current (DC) into alternating current (AC), and particularly, to improved switching techniques for conventional three-phase inverters.

BACKGROUND OF THE INVENTION

DC-AC power converters are part of the general power electronic converters family and are designed and operated to convert electrical energy from one stage voltage, current and/or frequency to another. Historically, DC-AC converters are referred to as inverters, and that term is used throughout this document. Inverters, as with other power electronics converters, are composed of groups of switching elements and are operated in a particular sequential manner to produce outputs with predefined specifications (voltage, current, and/or frequency). In general, power electronics converters operate by switching their elements in either full ON or full OFF modes in a sequential periodic manner to meet sets of predefined conditions on the output stage, as well as compliance with fundamental conditions for switching circuits. These conditions are required to avoid creating short circuits across the DC supply and to provide each switching element with the required time for changing its status from ON to OFF or OFF to ON. Adherence to these conditions by certain sequential switching methods produces AC outputs. However, outputs of these inverters contain different frequency components in addition to the desired fundamental frequency component. Such frequency components can create undesired features in the AC outputs as well as various levels of operational imperfections or inefficiencies.

The use of inverters is wide spread, and there are a variety of modulation techniques for switching the circuit elements of inverters to control both single phase and polyphase outputs. Generally, the two main types of inverters are single-phase (1ϕ) inverters and three-phase (3ϕ) inverters, and the literature is replete with topologies of 1ϕ and 3ϕ designed for particular tasks. Among the existing inverter modulation techniques are the pulse width modulation (PWM) and its different and improved versions, including selected harmonic elimination (SHE), random pulse-width modulation (RPWM), hysteresis-band current control (HBCC), delta modulation (DM), and other techniques. An inherent inefficiency of each of these methods is the reliance on a carrier frequency (or a band of carrier frequencies) to deliver the switching signals to the inverter. Spectral analysis of inverter outputs switched using these methods identify power deviation from the desired output frequency to these carrier harmonic frequencies (or frequency bands).

Inverter systems are being extensively utilized in various industrial applications including variable-speed motor drives (VSD), power quality improvement, renewable energy utilization, etc. An important characteristic of an inverter system for such applications is the ability to transfer high power from the DC side (input side) to the AC side (the output side) over a relatively wide range of output frequencies, in a manner which maximizes the amount of the energy on the AC output of the inverter in the chosen fundamental frequency components.

There are two traditional approaches for maximizing the energy concentration in an inverter's output fundamental frequency components. The first approach is based on minimizing the energy allocated in the undesirable harmonic components by calculating the switching times before the inverter is operated. Since this approach involves solving non-linear equations, it demands high level of computational and storage capabilities. One of the disadvantages of this approach is the complexities associated with controlling the inverter output. The second approach is based on generating switching signals with randomized frequency. One of the disadvantages of this approach is the reduction of the inverter overall efficiency due to the increase in the switching losses.

The prior art contains many examples of voltage source modulated power inverters capable of producing various waveforms. The modulation techniques in the prior art are mostly developed based on the load requirements, switching circuit capabilities, availability of the hardware to accommodate the implementation of the desired technique, etc.

There is a need for an inverter modulation technique that is developed and tested in correlation with the inverter function itself. There is a need for an inverter modulation technique that alleviates the reliance on a carrier signal (or band of carrier signals) to implementing switching. There is a need for an inverter modulation technique with improved response characteristics over a variety of loads.

SUMMARY OF THE INVENTION

This invention relates to the use of a wavelet modulation (WM) technique for switching 3ϕ inverters which is based on the inverter function itself, thereby eliminating the requirement of a carrier frequency for the switching scheme. Inherent efficiencies are gained by redirecting power, which would otherwise appear in output signal in the spectral component of the carrier frequency of the switching signal, to the desired primary output signal of the inverter.

The development of the wavelet modulation technique that is based on the sampling model of the 3ϕ inverter requires the construction of non-dyadic type multiresolution analysis (MRAs). These MRAs are required to characterize the non-uniform recurrent sampling-reconstruction of the CT reference-modulating signals. The sampling part of the non-dyadic MRA is represented as decomposing the processed CT signal(s) using sets of basis functions; the dual is represented by synthesis basis functions capable of reconstructing the processed CT signal(s). A new set of basis functions capable of constructing a non-dyadic type MRA is introduced for switching inverters.

A 3ϕ inverter of the present invention comprises an inverter for connection to a DC power supply and having control electronics for accepting a switching signal, and a switching signal derived from a non-dyadic MRA to support a non-uniform recurrent sampling-reconstruction process for the known desired output of the inverter, having the forms:

$$S_{Ma}(t) = \sin(\omega_m t) \qquad (1)$$

$$S_{Mb}(t) = \sin\left(\omega_m t - \frac{2\pi}{3}\right) \qquad (2)$$

$$S_{Mc}(t) = \sin\left(\omega_m t + \frac{2\pi}{3}\right) \qquad (3)$$

where $\omega_m = 2\pi f_m$ and $f_m$ is desired output frequency of the 3ϕ inverter.

This novel wavelet modulation technique generates switching pulses using a non-dyadic type multiresolution analysis (MRA), which is constructed by the scale-based linearly-combined basis functions. These generated switching pulses are dilated and translated versions of the synthesis scaling function so that at each scale and translation, one switching pulse is generated. This operational requirement is met as the scale j is related to the translation k by:

$$k = j-1; j,k \in \mathbb{Z}$$

where $\mathbb{Z}$ is the set of Integers.

As the output voltage of the wavelet modulated inverter is composed of successive dilated and translated versions of each synthesis scaling function, it can be expressed as infinite sums as:

$$\frac{v_a(t)}{V_{DC}} = \sum_{ja=1}^{J} (\tilde{\varphi}_a(t))_{ja} + \sum_{ja=1}^{J-1} (\tilde{\varphi}_a(t))_{(J-ja)}(t) -$$

$$\sum_{ja=1}^{J} \left(\tilde{\varphi}_a\left(t - \frac{T_m}{2}\right)\right)_{ja} - \sum_{ja=1}^{J-1} \left(\tilde{\varphi}_a\left(t - \frac{T_m}{2}\right)\right)_{(J-ja)}$$

$$\frac{v_b(t)}{V_{DC}} = \sum_{jb=1}^{J} (\tilde{\varphi}_b(t))_{jb} + \sum_{jb=1}^{J-1} (\tilde{\varphi}_b(t))_{(J-jb)}(t) -$$

$$\sum_{jb=1}^{J} \left(\tilde{\varphi}_b\left(t - \frac{T_m}{2}\right)\right)_{j2} - \sum_{j2=1}^{J-1} \left(\tilde{\varphi}_b\left(t - \frac{T_m}{2}\right)\right)_{(J-jb)}$$

$$\frac{v_c(t)}{V_{DC}} = \sum_{jc=1}^{J} (\tilde{\varphi}_c(t))_{jc} + \sum_{jc=1}^{J-1} (\tilde{\varphi}_c(t))_{(J-jc)}(t) -$$

$$\sum_{jc=1}^{J} \left(\tilde{\varphi}_c\left(t - \frac{T_m}{2}\right)\right)_{jc} - \sum_{jc=1}^{J-1} \left(\tilde{\varphi}_c\left(t - \frac{T_m}{2}\right)\right)_{(J-jc)}$$

Where $v_a(t)$, $v_b(t)$ and $v_c(t)$ are the voltages across the three inverter legs, $V_{DC}$ is the inverter input DC voltage and J is defined as:

$$J = \max(j); J \in \mathbb{Z} \quad (4)$$

The evaluation of these sums can yield a direct relationship between output voltages and J in the form of:

$$v_a(t) = f(V_{DC}, J, ja) \quad (5)$$

$$v_b(t) = f(V_{DC}, J, jb) \quad (6)$$

$$v_c(t) = f(V_{DC}, J, jc) \quad (7)$$

As a result, changing the value of f can be used to control the values of $v_a(t)$, $v_b(t)$ and $v_c(t)$.

The utilization of high frequency carrier signals (both the sawtooth and triangular) has been a common practice for implementing different modulation techniques for operating various power electronic converters. However, the wavelet modulation technique of the present invention does not require any carrier signals for its implementation, as it is completely based on realizing a non-uniform recurrent sampling-reconstruction process, which is supported by a non-dyadic multiresolution analysis. The carrier signal-free implementation of the wavelet modulation technique for both 1φ inverters and 3φ inverters is a primary feature of the modulation technique of the present invention, which results in the following advantages over the prior art:

Implementation and computational requirements are simplified as there is no need to generate any carrier signal(s) for the switching signals to the inverter;

Memory requirements are reduced, and hardware requirements are reduced as a result of eliminating the hardware required to generate any carrier signal(s);

The concerns of switching times associated with generating any carrier signal(s) at high frequencies are eliminated, as in the wavelet modulation technique, switching times are parts of the interval of support of each dilated and translated scale-based linearly-combined synthesis scaling function;

The quality of the inverter output is greatly improved as output harmonic components formed in frequency bands centered by any carrier signal frequency are eliminated having dispensing with any carrier signal(s);

The accuracy of determining the ON and OFF switching times is improved as detecting the intersection points between any digital carrier signal(s) and any digital reference-modulation signal(s) may have depended on the time step.

DETAILED DESCRIPTION OF THE INVENTION

Certain embodiments of the present invention will now be described in greater detail with reference to the accompanying drawings. Without limiting the generality of the application of the present invention to more complicated inverter circuit designs, the construction of an actual wavelet modulated switching methodology of the present invention is limited to the representation of the sample-based inverter model derived for the conventional 3φ 6 pulse inverter. On the basis of the disclosure herein, and state of the art methods of power systems and digital signal processing, it would be apparent to a person of skill in the art of in the arts of power systems and digital signal processing how to implement this scheme for other inverter topologies. The multiresolution analysis (MRA) used to created the wavelet modulated inverter of the present invention can be defined in relation to the mathematical model for the traditional 3φ inverter of FIG. 1. The inverter function can be mathematically represented as a non-uniform recurrent sampling reconstruction process, where the sampling part includes identifying the switching times and durations, while the reconstruction part includes synthesizing the inverter output using the switching signals of the sampling part. Unlike other inverter models, the sampling-based inverter model represents instantaneous switching actions as interpolating functions that aim to reconstruct the continuous-time (CT) reference-modulating signal from groups of non-uniform recurrent samples.

Figure 1:
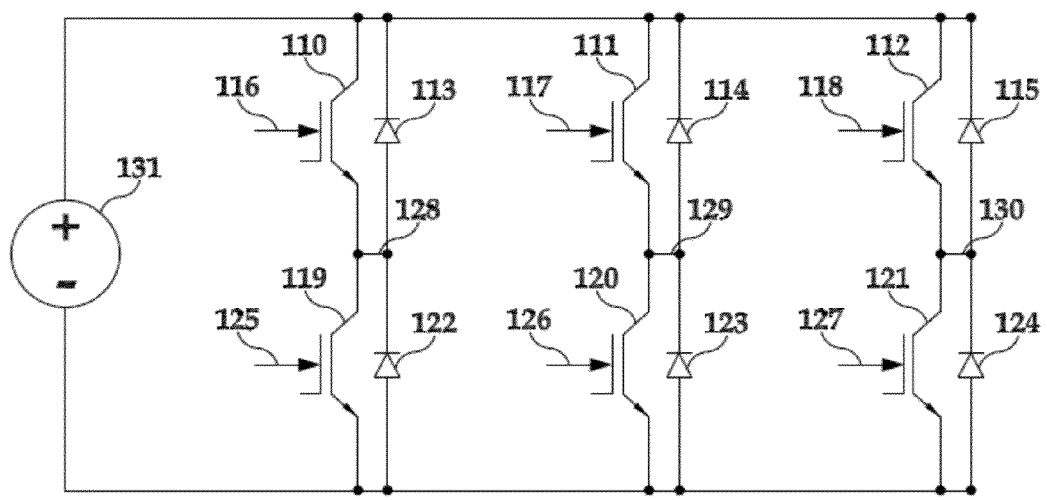
FIG. 1 is a circuit diagram of a traditional three phase six pulse inverter.

The basic operation of a conventional power inverter is illustrated in FIG. 1, the schematic of a conventional three-phase voltage source inverter, which supplied by the DC voltage source 131. The phase A, phase B, and phase C inverter outputs are derived from the inverter configuration comprised of 6 insulated gate bipolar transistors (IGBTs) (110, 111, 112, 119, 120 and 121). These output voltages are associated with phase A, phase B and phase C, and they appear at the three nodes (128, 129 and 130). Generating and delivering relevant drive signals (116, 117, 118, 125, 126 and 127) for the gates of the IGBTs (110, 111, 112, 119, 120 and 121) are the key to producing proper inverter output voltage. Diodes (113, 114, 115, 122, 123 and 124) protect the IGBTs (110, 111, 112, 119, 120 and 121) from reverse voltage.

For the power inverter of FIG. 1, the gating signals (116, 117, 118, 125, 126 and 127) switch the IGBTs (110, 111, 112, 119, 120 and 121), such that voltages at nodes (128, 129 and 130) can be described as trains of periodic, variable-width rectangular pulses.

Figure 2:
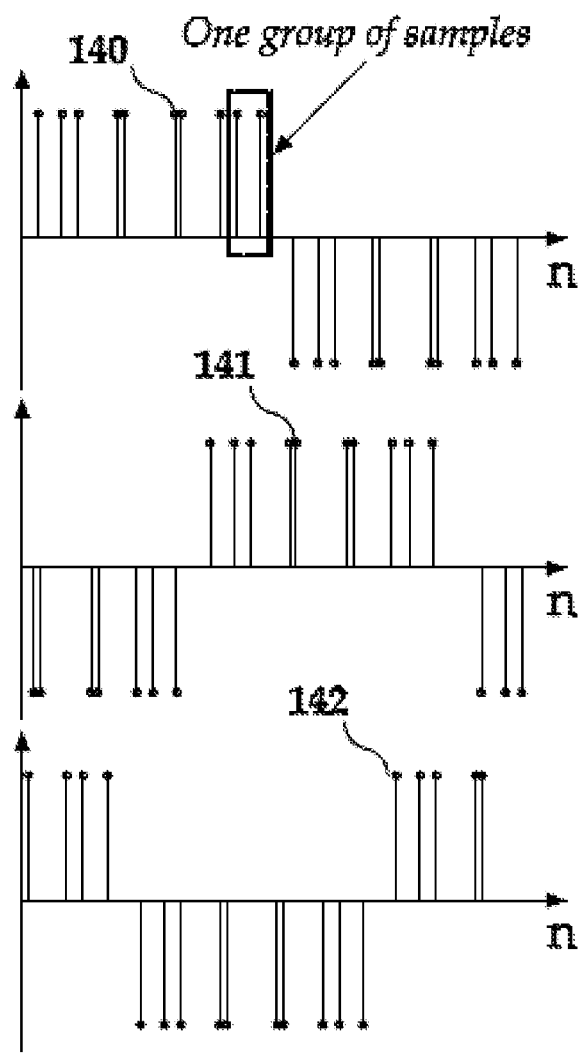
FIG. 2 is a graphical representation of non-uniform recurrent sampling of the three phases used to reconstruct the signals in FIG. 3.
Figure 3:
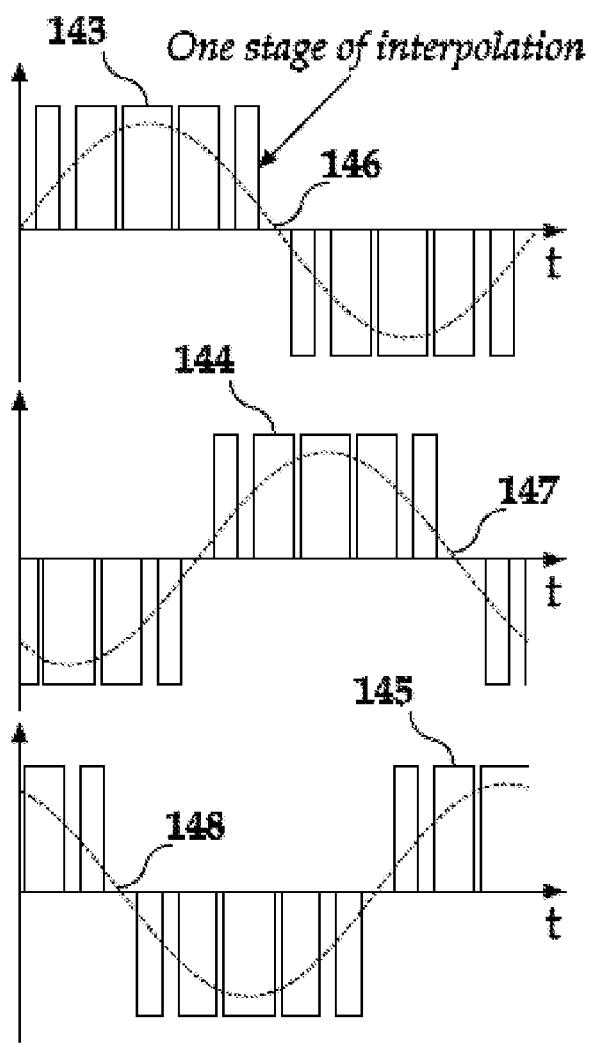
FIG. 3 is graphical depiction of pulse reconstruction of the desired three phase inverter output.

FIG. 2 shows a sample group of output voltage signals 140, 141 and 142 taken at nodes 128, 129 and 130 of FIG. 1, respectively. These output voltage signals (140, 141 and 142) are considered as stages of interpolation to reconstruct three CT signals 146, 147 and 148 from the three discrete signals 143, 144 and 145, as illustrated in FIG. 3, and further described below. The three CT signals 146, 147 and 148 can be sampled in a non-uniform recurrent manner in order to produce groups of non-uniform samples. Each group of samples is composed of two samples so that one rectangular pulse is defined over the time interval of that group of samples. The produced groups of samples defined three discrete output voltage signals 140, 141 and 142 which can then be formulated as the one stage interpolations of the desired CT signals, as:

$$S_{Ma}[n] = \int_r \left( \sum_r \sum_{d=0}^M \sum_{p=1}^2 S_{Ma}(t)\delta(t - t_{dp} - rT_m) \right) dt \quad (8)$$

$$S_{Mb}[n] = \int_r \left( \sum_r \sum_{d=0}^M \sum_{p=1}^2 S_{Mb}(t)\delta(t - t_{dp} - rT_m) \right) dt \quad (9)$$

$$S_{Mc}[n] = \int_r \left( \sum_r \sum_{d=0}^M \sum_{p=1}^2 S_{Mc}(t)\delta(t - t_{dp} - rT_m) \right) dt \quad (10)$$

where:
$S_{Ma}[n]$, $S_{Mb}[n]$ and $S_{Mc}[n]$ are the reference modulating signals 143, 144 and 145; T is a small time interval; r=1, 2, ..., $T_m = 1/f_m$ is the period of each CT signal; M is the number of sample groups over $T_m$; and $\delta(t)$ is the Dirac delta function. The three sets $\{(t_{dp})_a\}$, $\{(t_{dp})_b\}$, and $\{(t_{dp})_c\}$ represent sets of time locations of sample groups over $T_m$ for the three CT reference signals.

The reconstruction of the three CT signals 146, 147 and 148 from the non-uniform, recurrent sampled signals 140, 141 and 142 is carried out using Lagrange interpolation functions, which can be defined for sample groups da of CT signal 146, db of CT signal 147, and dc of CT signal 148, respectively, as:

$$\lambda_{da}(t) = \frac{S_{Ma}(t_{da1})G_{da}(t)}{G'_{da}(t_{da1})(t - t_{da1})} + \frac{S_{Ma}(t_{da2})G_{da}(t)}{G'_{da}(t_{da2})(t - t_{da2})} \quad (11)$$

$$\lambda_{db}(t) = \frac{S_{Mb}(t_{db1})G_{db}(t)}{G'_{db}(t_{db1})(t - t_{db1})} + \frac{S_{Mb}(t_{db2})G_{db}(t)}{G'_{db}(t_{db2})(t - t_{db2})} \quad (12)$$

$$\lambda_{dc}(t) = \frac{S_{Mc}(t_{dc1})G_{dc}(t)}{G'_{dc}(t_{dc1})(t - t_{dc1})} + \frac{S_{Mc}(t_{dc2})G_{dc}(t)}{G'_{dc}(t_{dc2})(t - t_{dc2})} \quad (13)$$

where: $G_{da}(t)$, $G_{db}(t)$ and $G_{dc}(t)$ are Lagrangian interpolating functions over sample groups da, db, and dc, for each CT reference modulating signal, and are given by $$G_{da}(t) = t \prod_{p=1}^2 \left(1 - \frac{t}{t_{dap}}\right) \quad (14)$$

$$G_{db}(t) = t \prod_{p=1}^2 \left(1 - \frac{t}{t_{dbp}}\right) \quad (15)$$

$$G_{dc}(t) = t \prod_{p=1}^2 \left(1 - \frac{t}{t_{dcp}}\right) \quad (16)$$

and where $G'_{da}(t)$, $G'_{db}(t)$, and $G'_{dc}(t)$ are the first derivatives of the Lagrangian interpolating functions over the sample groups da, db, and dc, for each CT reference modulating signal, and are given by:

$$G'_{da}(t_{dap}) = \left.\frac{dG_{da}(t)}{dt}\right|_{t=t_{dap}} \quad (17)$$

$$G'_{db}(t_{dbp}) = \left.\frac{dG_{db}(t)}{dt}\right|_{t=t_{dbp}} \quad (18)$$

$$G'_{dc}(t_{dcp}) = \left.\frac{dG_{dc}(t)}{dt}\right|_{t=t_{dcp}} \quad (19)$$

The time intervals $[t_{d1}, t_{d2}]_a$, $[t_{d1}, t_{d2}]_b$ and $[t_{d1}, t_{d2}]_c$, are time intervals for the three interpolating functions $\lambda_{da}(t)$, $\lambda_{db}(t)$, and $\lambda_{dc}(t)$. Due to periodicity of the sample groups, these three interpolating functions are periodic with a period of $T_m$. The reconstructed signals 143, 144 and 145 (being the first interpolation of the desired CT signals) at nodes 128, 129 and 130 can be expressed in terms of the defined interpolating functions as $$V_{ab}(t) = V_{DC} \sum_r \sum_{d=0}^M \lambda_{da}(t - rT_m) \quad (20)$$

$$V_{bc}(t) = V_{DC} \sum_r \sum_{d=0}^M \lambda_{db}(t - rT_m) \quad (21)$$

$$V_{ca}(t) = V_{DC} \sum_r \sum_{d=0}^M \lambda_{dc}(t - rT_m) \quad (22)$$

It is evident from equations (20), (21) and (22) that output voltages at nodes 128, 129 and 130 are dependent on the interpolating functions $\lambda_{da}(t)$, $\lambda_{db}(t)$, and $\alpha_{dc}(t)$.

As noted above, the development of the wavelet modulation technique that is based on the sampling model of the 3ϕ inverter just presented, requires the construction of non-dyadic type MRAs. These MRAs are required to characterize the non-uniform recurrent sampling-reconstruction of the CT reference-modulating signals. The sampling part of the non-dyadic MRA is represented as decomposing the processed CT signal(s) using sets of basis functions; the dual is represented by synthesis basis functions capable of reconstructing the processed CT signals(s). A new set of basis functions capable of constructing a non-dyadic type MRA is introduced for switching inverters. These new basis functions are generated by a single scaling function that is called the scale-based linearly-combined scaling function, and is given in scale j as:

$$\phi_j(t)=\phi(2^{j+1}t)+\phi(2^{j+1}(t-1+2^{-(j+1)})) \quad (23)$$

where $\phi(2^j t)=\Phi_j(t)$ is the Haar scaling function at scale j. The scale-based linearly-combined scaling function $\phi(t)$ has a dual synthesis scaling function $\tilde{\phi}(t)$ that is capable of generating the basis functions needed to perform the reconstruction part of the non-dyadic MRA. These generated basis functions at different scales (dilations) and translations (time-shifts) act as switching pulses to activate the inverter switching elements. The scale-based linearly-combined synthesis scaling function $\tilde{\phi}(t)$ at scale j is defined as:

$$\tilde{\phi}_j(t)=\phi(t)-\phi_j(t) \quad (24)$$

The scale-based linearly-combined scaling function $\phi(t)$ and its dual synthesis scaling function $\tilde{\phi}(t)$ generate basis functions capable of spanning spaces that provide a lay out for constructing a non-dyadic MRA. The constructed MRA characterizes a non-uniform recurrent sampling reconstruction process. As such, the wavelet modulation technique of the present invention as a switching technique is correlated with the sampling-based inverter model.

Figure 4:
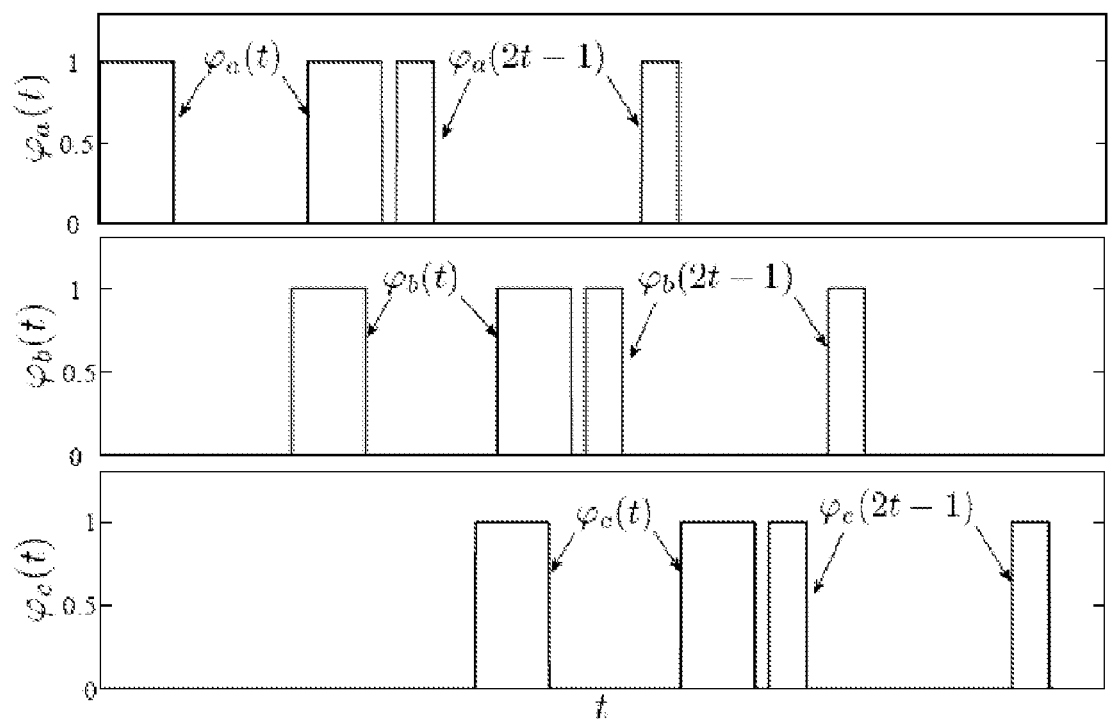
FIG. 4 is graphical depiction of the three scaling functions $\phi_a(t)$, $\phi_b(t)$ and $\phi_c(t)$.

One aspect of the present invention is to apply this approach to switch a 3φ inverter, by using the concept of a shifted sampling function. Shifting the sampling function implies defining shifted versions of $\phi(t)$ and its dual $\tilde{\phi}(t)$ to process the three CT reference-modulating signals for 3φ inverters. These shifted versions of the scale-based linearly-combined scaling function are defined as:

$$(\phi_a(t))_{ja}=\phi(2^{ja+1}t)+\phi(2^{ja+1}(t-1+2^{-(ja+1)})) \quad (25)$$

$$(\phi_b(t))_{jb}=\phi(2^{jb+1}t)+\phi(2^{jb+1}(t-1+2^{-(jb+1)})) \quad (26)$$

$$(\phi_c(t))_{jc}=\phi(2^{jc+1}t)+\phi(2^{jc+1}(t-1+2^{-(jc+1)})) \quad (27)$$

where $j_a=1, 2, \ldots, J, j_a \in \mathbb{Z}, j_b=j_a+j_b, j_b \in \mathbb{Z}$, and $j_c=j_a+j_c, j_c \in \mathbb{Z}$. As in equations arising out of the model for the inverter in FIGS. 1, 2 and 3, the suffixes a, b, and c can be seen to refer to the three phases, phase a, phase b, and phase c, on the inverter output, respectively. (For ease of viewing, $j_a$ and similar terms are occasionally written ja where subscripting would render them too small for reproduction.) FIG. 4 shows the three scaling functions $\phi_a(t)$, $\phi_b(t)$ and $\phi_c(t)$ for $j_a, j_b, j_c=1, 2$.

The non-dyadic MRA constructed from the three defined scaling functions is spanned by their generated basis functions $\{(\phi_a(t))_{ja,k}\}, \{(\phi_b(t))_{jb,k}\}$ and $\{(\phi_c(t))_{jc,k}\}$, where k, $j_a, j_b, j_c \in \mathbb{Z}$. These spanned spaces can be formulated as:

$$V_j(\phi)=\text{clos}_{L^2}[\{(\phi_a(t))_{ja,k}\}, \{(\phi_b(t))_{jb,k}\}, \{(\phi_c(t))_{jc,k}\}] \quad (28)$$

The three scaling functions $\phi_a(t)$, $\phi_b(t)$ and $\phi_c(t)$, shown in FIG. 4, are capable of creating sets of non-uniform recurrent sample groups from the three sinusoidal signals $S_{Ma}(t)$, $S_{Mb}(t)$ and $S_{Mc}(t)$. The sampling of three different CT signals using different sampling functions requires three synthesis functions to reconstruct these CT signals from their samples. Pursuant to the present invention, reconstructing the three CT sinusoidal signals is carried out by using dilated and translated versions of the dual synthesis scaling functions for those signals. These scale-based linearly-combined synthesis functions are defined as:

$$(\tilde{\phi}_a(t))_{ja}=\phi_H(t)-(\phi_a(t))_{ja} \quad (29)$$

$$(\tilde{\phi}_b(t))_{jb}=\phi_H(t)-(\phi_b(t))_{jb} \quad (30)$$

$$(\tilde{\phi}_c(t))_{jc}=\phi_H(t)-(\phi_c(t))_{jc} \quad (31)$$

Figure 5:
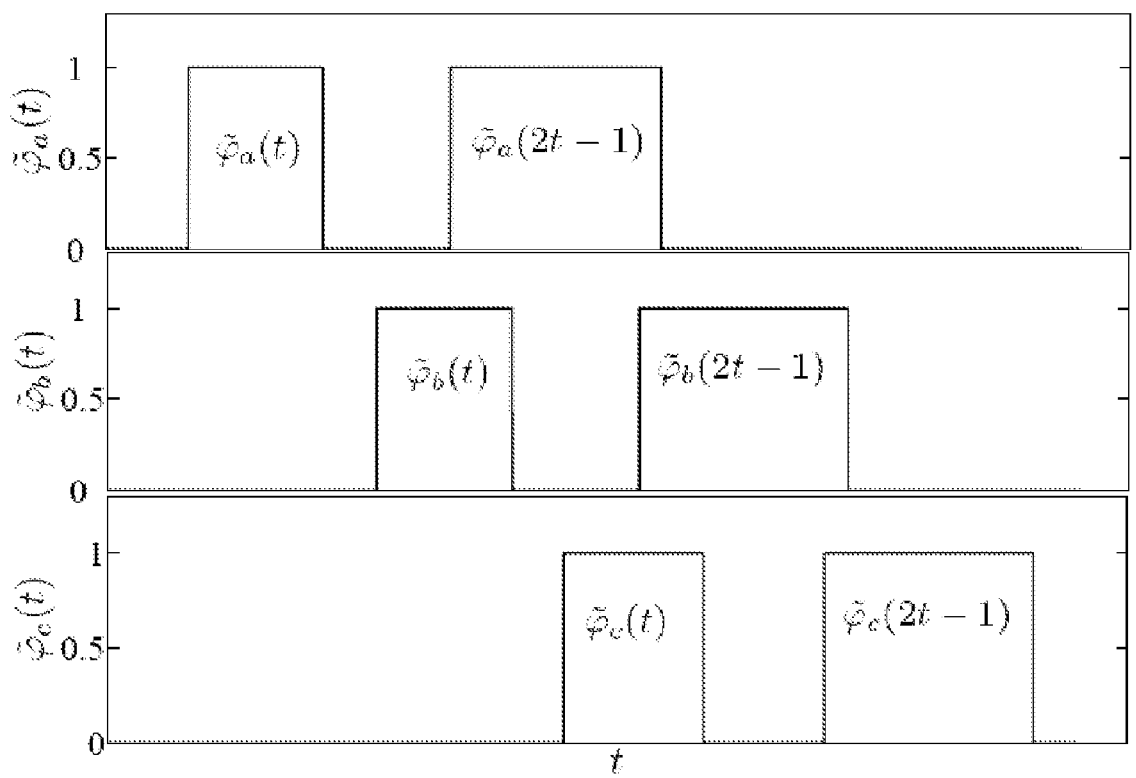
FIG. 5 is a graphical depiction of the three synthesis scaling functions $\tilde{\phi}_a(t)$, $\tilde{\phi}_b(t)$ and $\tilde{\phi}_c(t)$ for $j_a$, $j_b$, $j_c$=1, 2.

FIG. 5 shows the three synthesis scaling functions $\tilde{\phi}_a(t)$, $\tilde{\phi}_b(t)$ and $\tilde{\phi}_c(t)$ for $j_a, j_b, j_c=1, 2$.

The definition of the sampling and reconstruction scaling functions provides a wavelet representation for the three CT reference-modulating signals as:

$$S_{Ma}(t) = \sum_{ja}\sum_{k\in\mathbb{Z}} \langle\langle\langle S_{Ma}(t), (\varphi_a(t-k))_{ja}\rangle\rangle_2, (\tilde{\varphi}_a(t-k))_{ja}\rangle \quad (32)$$

$$S_{Mb}(t) = \sum_{jb}\sum_{k\in\mathbb{Z}} \langle\langle\langle S_{Mb}(t), (\varphi_b(t-k))_{jb}\rangle\rangle_2, (\tilde{\varphi}_b(t-k))_{jb}\rangle \quad (33)$$

$$S_{Mc}(t) = \sum_{jc}\sum_{k\in\mathbb{Z}} \langle\langle\langle S_{Mc}(t), (\varphi_c(t-k))_{jc}\rangle\rangle_2, (\tilde{\varphi}_c(t-k))_{jc}\rangle \quad (34)$$

where $\langle\langle,\rangle\rangle_2$ is the inner biproduct. The inner biproducts of equations (33), (34) and (35) are given as:

$$\langle\langle S_{Ma}(t),(\phi_a(t-k))_{ja}\rangle\rangle_2 = \{\int_{dT_\phi}^{tad1} S_{Ma}(t)\phi(2^{ja+1}t)dt, \int_{tad2}^{(d+1)T_\phi} S_{Ma}(t)\phi(2^{ja+1}(t-1+2^{-(ja+1)}))dt\} \quad (35)$$

$$\langle\langle S_{Mb}(t),(\phi_b(t-k))_{jb}\rangle\rangle_2 = \{\int_{dT_\phi}^{tbd1} S_{Mb}(t)\phi(2^{jb+1}t)dt, \int_{tbd2}^{(d+1)T_\phi} S_{Mb}(t)\phi(2^{jb+1}(t-1+2^{-(jb+1)}))dt\} \quad (36)$$

$$\langle\langle S_{Mc}(t),(\phi_c(t-k))_{jc}\rangle\rangle_2 = \{\int_{dT_\phi}^{tcd1} S_{Mc}(t)\phi(2^{jc+1}t)dt, \int_{tcd2}^{(d+1)T_\phi} S_{Mc}(t)\phi(2^{jc+1}(t-1+2^{-(jc+1)}))dt\} \quad (37)$$

where $T_\phi$ is the interval of support of the Haar scaling function $\phi(2^{jc+1}t)$ at scale j=0, and is determined as:

$$T_\phi = \frac{T_m}{2(J^2+J)} \quad (38)$$

where J is given by:

$$J=\max(j_a)=\max(j_b)=\max(j_c) \quad (39)$$

J is determined experimentally for each operating frequency, $f_m$. Relationships can then be derived between the scales on each phase, however, these relationships result in non-integer values which must then be rounded up for implementation purposes.

For a 3φ inverter, recall that the three sinusoidal reference modulating signals are given by equations (1), (2) and (3).

The determination of the scale shifts in the scaling function $\phi(t)$ are needed in order to defined two versions of $\phi(t)$, as $\phi_b(t)$ and $\phi_c(t)$, capable of establishing MRAs to process both $S_{Mb}(t)$ and $S_{MC}(t)$. The scaling function $\phi(t)$ samples the CT sinusoidal signal $S_{Ma}(t)$ and creates one sample group at each scale j and translation k. Furthermore, the scale j is changing depending on the sign of the first derivative of $S_{Ma}(t)$ (i.e. the scale increases stepwise so long as $S_{Ma}(t)$ at the end of a sample period is increasing, and then decreases stepwise so long as $S_{Ma}(t)$ at the end of a sample period is decreasing). Since the sampled sinusoidal signal $S_{Ma}(t)$ has a quarter-cycle summitry, the maximum value of the scale J=max (j) is reached over the quarter of $S_{Ma}(t)$.

Each value of the scale j=1, 2, ..., J will be defined over the interval of support of $\phi(2^j t)$ such that $$\sum_{j=1}^{J} 2^{j-1} T_u = \frac{T_m}{4} \quad (40)$$

where $T_u$ is the interval of support for $\phi(t)$ at j=1. The summation of equation (40) ca be evaluated as:

$$\sum_{j=1}^{J} 2^{j-1} T_u = T_u \frac{1-2^{J+1}}{1-2} = T_u(2^{J+1}-1) \quad (41)$$

In order to define a version of the scale-based linearly combined scaling function $\phi(t)$ that will sample the sinusoidal signal $S_{Mb}(t)$, the shift in the scale $j_b$ can be determined as:

$$T_u 2^{j_b-1} = T_u + \frac{T_m}{3} \rightarrow (2^{j_b-1}-1)T_u = \frac{T_m}{3} \quad (42)$$

Substituting the value of $T_u$ and solving the equation (42) produces:

$$(2^{j_b-1}-1)\frac{T_m}{4(2^{J+1}-1)} = \frac{T_m}{3} \quad (43)$$

This can be simplified to:

$$(2^{j_b-1}-1) = \frac{1}{3}(2^{J+3}-1) \quad (44)$$

Solving this equation using the approximation $(2^{J+3}-1) \approx 2^{J+3}$, yields $$j_b - 1 = \frac{\ln\left(\frac{1}{3}\right)}{\ln(2)} + J + 3 \quad (45)$$

$$j_b \approx J + 2.42 \quad (46)$$

Since $j_b \in \mathbb{Z} \Rightarrow j_b = J+3$. Since the scale is symmetrical around J, then J+3 will have the same value as J−3. Similarly, $$j_c - 1 = \frac{\ln\left(\frac{2}{3}\right)}{\ln(2)} + J + 3 \quad (47)$$

$$j_c \approx J + 1.42 \quad (48)$$

and since $j_c \in \mathbb{Z} \Rightarrow j_c = J+2$. As determined experimentally, J=8, therefore, in practise, the values of $j_a$, $j_b$ and $j_c$ are determined as:

$$j_a = j_a \quad (49)$$

$$j_b = j_a J - 3 \quad (50)$$

$$j_c = j_a J - 2 \quad (51)$$

Also, for a given output signal period $T_m$, the interval of support can be computed as:

$$T_\phi = \frac{T_m}{2(8^2+8)} = \frac{T_m}{144} \quad (52)$$

Therefore, over 32 steps per period of each leg of the inverter as the algorithm cycles over the 4 symmetrical quadrants, synchronization of the switches is achieved with far greater simplicity, in a non-dyadic fashion, without the need for a carrier signal to generate the switching pulses.

Equations (32) through (37) indicate that two samples are created over the interval of support of each scaling function at each scale. The non-dyadic type MRA representation of the three CT reference modulating signals provides a mathematical expression for the output voltage of each leg of a 3 $\phi$ 6-pulse VS WM inverter. Equations (43), (44) and (45) provide mathematical formulas for the output voltages of the inverter three legs for an inverter switched according to the method of the present invention.

$$\frac{v_a(t)}{V_{DC}} = \sum_{ja=1}^{J} (\tilde{\varphi}_a(t))_{ja} + \sum_{ja=1}^{J-1} (\tilde{\varphi}_a(t))_{(J-ja)}(t) - \sum_{ja=1}^{J} \left(\tilde{\varphi}_a\left(t-\frac{T_m}{2}\right)\right)_{ja} - \sum_{ja=1}^{J-1} \left(\tilde{\varphi}_a\left(t-\frac{T_m}{2}\right)\right)_{(J-ja)} \quad (53)$$

$$\frac{v_b(t)}{V_{DC}} = \sum_{jb=1}^{J} (\tilde{\varphi}_b(t))_{jb} + \sum_{jb=1}^{J-1} (\tilde{\varphi}_b(t))_{(J-jb)}(t) - \sum_{jb=1}^{J} \left(\tilde{\varphi}_b\left(t-\frac{T_m}{2}\right)\right)_{jb} - \sum_{jb=1}^{J-1} \left(\tilde{\varphi}_b\left(t-\frac{T_m}{2}\right)\right)_{(J-jb)} \quad (54)$$

$$\frac{v_c(t)}{V_{DC}} = \sum_{jc=1}^{J} (\tilde{\varphi}_c(t))_{jc} + \sum_{jc=1}^{J-1} (\tilde{\varphi}_c(t))_{(J-jc)}(t) - \sum_{jc=1}^{J} \left(\tilde{\varphi}_c\left(t-\frac{T_m}{2}\right)\right)_{j3} - \sum_{j3=1}^{J-1} \left(\tilde{\varphi}_c\left(t-\frac{T_m}{2}\right)\right)_{(J-jc)} \quad (55)$$

where $v_a(t)$, $v_b(t)$ and $v_c(t)$ are the voltages across the three inverter legs, and $V_{DC}$ is the inverter DC voltage.

In a preferred embodiment of the present invention, the wavelet modulation technique provides the switching signals for a 3 $\phi$ inverter. The three CT reference-modulating signals are processed using the non-dyadic type MRAs constructed using $\phi_a(t)$, $\phi_b(t)$, $\phi_c(t)$, $\tilde{\phi}_a(t)$, $\tilde{\phi}_b(t)$ and $\tilde{\phi}_c(t)$. The three synthesis scaling functions $\tilde{\phi}_a(t)$, $\tilde{\phi}_b(t)$ and $\tilde{\phi}_c(t)$ provide switching signals for the 3$\phi$ inverter. For the 3 $\phi$ 6-pulse VS inverter, the implementation of the wavelet modulation method of the present invention is divided into 2 parts, as follows:

Part 1: Sampling $S_{Ma}(t)$, $S_{Mb}(t)$ and $S_{Mc}(t)$ in a non-uniform recurrent manner using the $\{(\phi_a(t))_{(j,k)}\}$, $\{(\phi_b(t))_{(j,k)}\}$ and $\{(\phi_c(t))_{(j,k)}\}$ sets of wavelet basis functions derived above. The created samples in sample groups da, db, and dc at scale j for the three CT sampled signals are located at the boundaries of the intervals $[t_{da1}, t_{da2}]$, $[t_{db1}, t_{db2}]$ and $[t_{dc1}, t_{dc2}]$. These time locations are determined as:

$$\text{for } S_{Ma}(t) \begin{cases} t_{da1} = dT_\phi + 2^{-(j1+1)} \\ t_{da2} = (d+1)T_\phi - 2^{-(j1+1)} \end{cases} \quad (56)$$

-continued $$\text{for } S_{Mb}(t) \begin{cases} t_{db1} = dT_\phi + 2^{-(j2+1)} \\ t_{db2} = (d+1)T_\phi - 2^{-(j2+1)} \end{cases} \quad (57)$$

$$\text{for } S_{Mc}(t) \begin{cases} t_{dc1} = dT_\phi + 2^{-(j3+1)} \\ t_{dc2} = (d+1)T_\phi - 2^{-(j3+1)} \end{cases} \quad (58)$$

where d=0, 1, 2, ..., D−1, and D is the number of created sample groups over $T_m$.

Part 2: Generating switching pulses using the three synthesis scale-based linearly-combined scaling functions $(\tilde{\phi}_a(t))_{(j,k)}$, $(\tilde{\phi}_b(t))_{(j,k)}$ and $(\tilde{\phi}_c(t))_{(j,k)}$, where:

$$(\tilde{\phi}_a(t))_{(j1,k)} = \tilde{\phi}_a(2^j t - k); j1=1,2,\ldots,k \in \mathbb{Z} \quad (59)$$

$$(\tilde{\phi}_b(t))_{(j2,k)} = \tilde{\phi}_b(2^j t - k); j2=1,2,\ldots,k \in \mathbb{Z} \quad (60)$$

$$(\tilde{\phi}_c(t))_{(j3,k)} = \tilde{\phi}_c(2^j t - k); j3=1,2,\ldots,k \in \mathbb{Z} \quad (59)$$

Each switching pulse is created as a dilated (different value of the scale j) and translated (different value of the shift k) version of the three synthesis scaling functions. Also, each of these generated switching pulses will have its duration and location determined as in equations (46), (47) and (48).

The time interval and the location of each sample group of each CT reference modulating signal change due to the changes of the scale j and the translation k. It should be noted that the starting value of the scale j (for each scaling function) has to be initialized as $j_0 > 0$. This condition is necessary to avoid uniform sampling with $j_0 = 0$. Therefore, $j_a = 1$, and the other values of $j_b$ and $j_c$ are adjusted accordingly by the routine.

The wavelet modulation technique of the present invention can be implemented through the following steps:

Step 1: Initialize the scales j1=1, j2=5 and j3=6, t=0 and the index of sample groups d to $d_0=0$ for each phase.

Step 2: Create samples at $t_{da1}$, $t_{da2}$, $t_{db1}$, $t_{db2}$, $t_{dc1}$ and $t_{dc2}$.

Step 3: Apply the following routine:
 If $S'_{Ma}(t_{da2}) > 0$, then j1=j1+1;
 If $S'_{Ma}(t_{da2}) < 0$, then j1=j1−1;
 If $S'_{Mb}(t_{db2}) > 0$, then j2=j2+1;
 If $S'_{Mb}(t_{db2}) < 0$, then j2=j2−1;
 If $S'_{Mc}(t_{dc2}) > 0$, then j3=j3+1; and
 If $S'_{Mc}(t_{dc2}) < 0$, then j3=j3−1;
where: d=0,1,2, ..., D−1, and D is the number of created sample groups over $T_m$.
 $S'_{Ma}(t) = d(S_{Ma}(t))/dt$;
 $S'_{Mb}(t) = d(S_{Mb}(t))/dt$
 $S'_{Mc}(t) = d(S_{Mc}(t))/dt$.

Step 4: Generate an ON pulse over the time interval of the samples group d for each CT reference-modulating signal.

Step 5: Apply the following routine:
 If $t \geq T_m$, then set j1=1 and set da=0, else set da=da+1;
 If $t \geq 4/3 T_m$, then set j2=1 and set db=0, else set db=db+1;
 If $t \geq 5/3 T_m$, then set j3=1 and set dc=0, else set dc=dc+1;

Step 6: $t = t + T_{st}$; where $T_{st}$ is the time step of the inverter.

Step 7: Go to Step 2.

Figure 6:
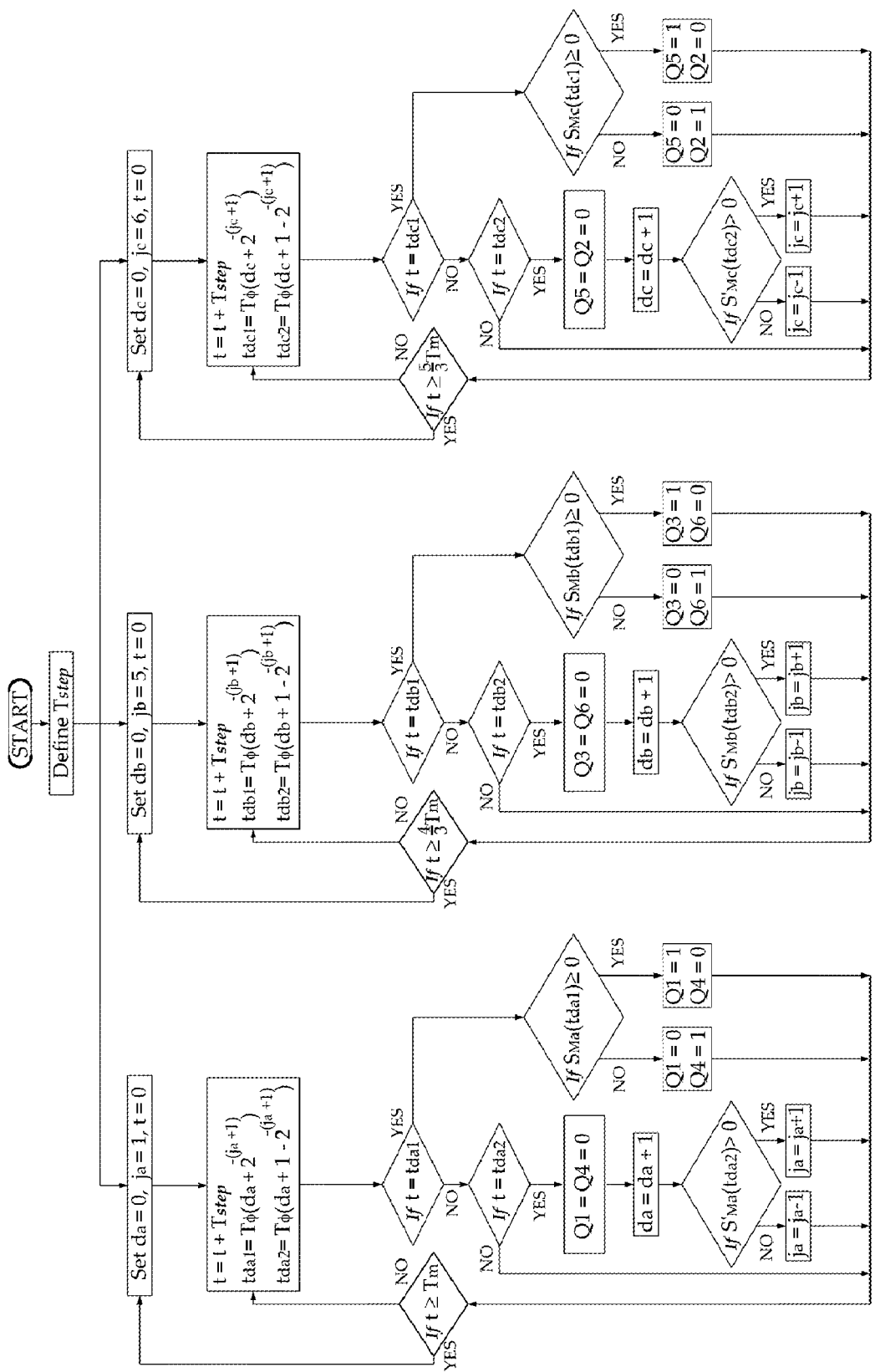
FIG. 6 is a flowchart for a preferred method of generating the switching pulses for a wavelet modulated inverter of the present invention having a fundamental frequency of 60 Hz. The time step is $T_{step}$=40 μsec.

These steps for implementing a preferred embodiment of the present invention are given in the flowchart of FIG. 6. Step 4 is implemented by triggering the applicable ON switch on the applicable leg of the inverter when=$t_{da1}$, $t_{db1}$, $t_{dc1}$, respectively and shutting off the applicable leg of the inverter when t=$t_{da1}$, $t_{db1}$, $t_{dc1}$, respectively; for switching pairs (Q1, Q4), (Q2, Q5) and (Q3, Q6) respectively.

Figure 7:
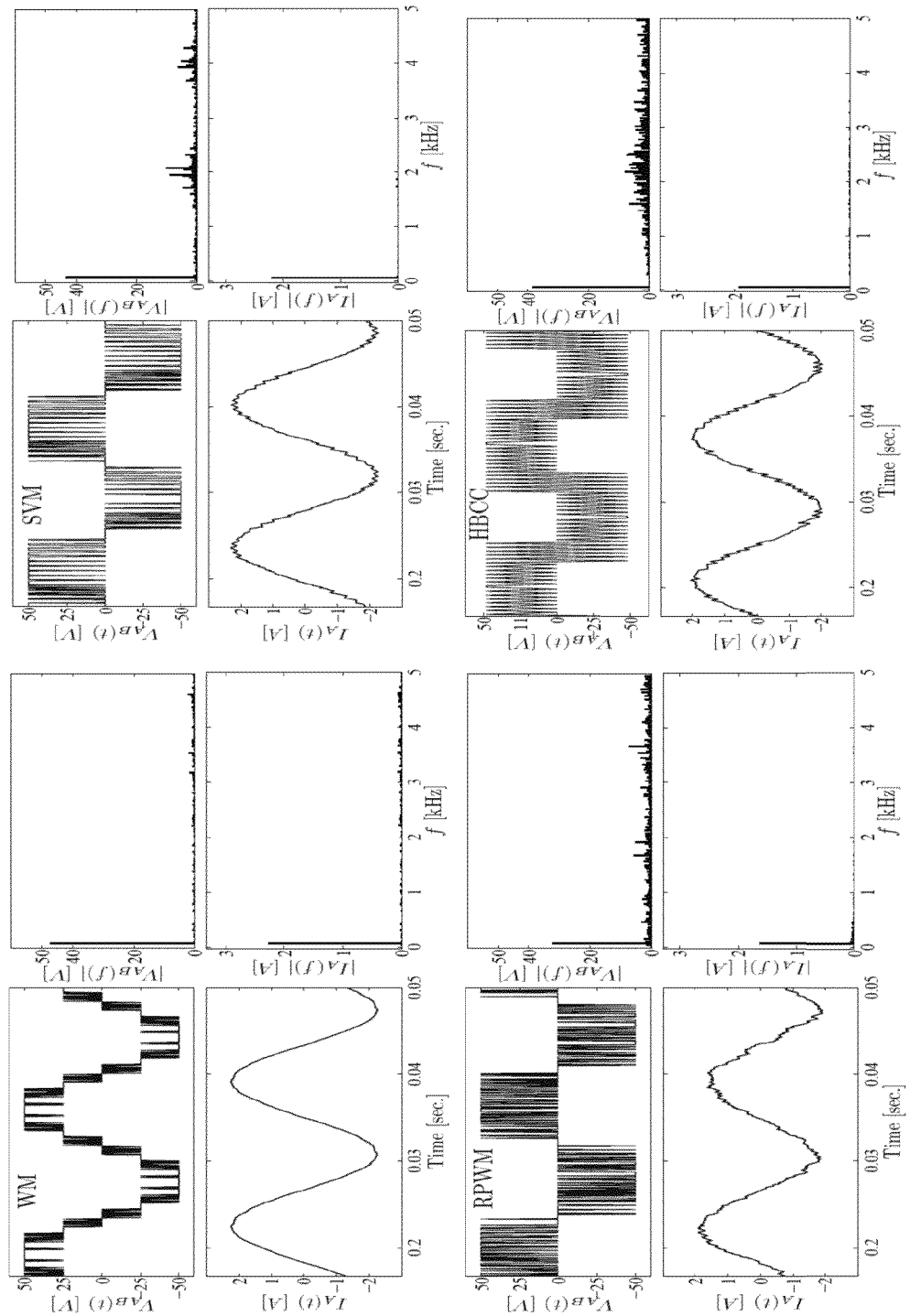
FIG. 7(a), (b), (c) and (d) shows MATLAB simulation results for the R-L load (the linear load) line voltage $V_{AB}(t)$) (upper left panels) and line current $I_A(t)$) (lower left panels) along with their spectra when supplied by: (a) the WM inverter, (b) the SVM inverter, (c) the RPWM inverter, and (d) the HBCC inverter.

Various comparisons between the inverter of the present invention and other state of the art methods can be made. FIG. 7 compares the line voltages, the line currents, and their respective spectra, as between (a) the Wavelet Modulated (WM) inverter of FIG. 6; (b) the space vector modulated (SVM) inverter; (c) the random pulse width modulated (RPWM) inverter, and (d) the hysteresis band current controlled (HBCC) inverter, for a system using $T_{st}$=40 μsec. In each case, the inverter is subject to a linear load: a 3ϕY—connected R-L load with an impedance of ZL=15+j12.82 Ω/phase. The response in simulated in MATLAB under common constraints. The harmonic spectra in FIGS. 7(a), 7(b), 7(c) and 7(d) show that the WM inverter output voltage has a higher magnitude of its fundamental frequency than those obtained using the SVM, RPWM and HBCC inverters. These voltage harmonic spectra show that the WM inverter output voltage has lower harmonic contents than output voltages produced by SVM, RPWM and HBCC inverters. Furthermore, features observed in the voltage spectra can be observed in the load current spectra as shown in FIGS. 7(a), 7(b), 7(c) and 7(d). The higher values of the fundamental components of the load voltage and current supplied by the proposed WM inverter indicate a significant ability of the WM inverter to transfer higher power from the supply to the load.

The data in Table I demonstrate consistent features of the outputs produced by the 3 ϕ WM inverter for supplying different load types. Also, Table I shows that the 3 ϕ WM inverter of the present invention can outperform the HBCC, SVM and RPWM inverters under similar loading conditions. Finally, the experimental data in Table I confirm that both memory requirements and execution times can be significantly reduced using the wavelet modulation technique of the present invention. These features of the proposed technique are due to its simple structure, low computational burden and ease of implementation.

TABLE I

SUMMARY OF COMPARATIVE EXPERIMENTAL RESULTS

| Load | Parameter | WM | |
|---|---|---|---|
| | | | HBCC |
| IPM Motor | |V1|rms | 194.8 V | 142.6 V |
| | THDV | 18.32% | 31.63% |
| | Memory Size | 38 KB | 86 KB |
| | Execution Time | 50 μsec. | 110 μsec. |
| | | | SVM |
| R-L Load | |V1|rms | 79.3 V | 73.8 V |
| | THDV | 14.32% | 29.69% |
| | Memory Size | 38 KB | 64 KB |
| | Execution Time | 50 μsec. | 78 μsec. |
| | | | RPWM |
| 3ϕ Rectifier Load | |V1|rms | 98.9 V | 81.6 V |
| | THDV | 19.68% | 36.87% |
| | Memory Size | 38 KB | 72 KB |
| | Execution Time | 50 μsec. | 72 μsec. |

Three loads were tested. First, the 3ϕ interior permanent magnet (IPM) motor was tested to demonstrate the experimental performance of the 3ϕ voltage source wavelet modulated inverter, when supplying a highly non-linear dynamic load. During this test, a load of 2 N.m, which is provided by a Lab Volt electrodynamometer, was applied on the shaft of the tested 1-hp laboratory IPM motor. To further demonstrate the performance of the 3ϕ 6-pulse VS WM inverter for supplying a dynamic load, the test IPM motor was supplied by a 3φ VS hysteresis band current controlled (HBCC) inverter. Also, the same 2 N.m load was applied on the motor shaft during this test. The employed 3φ VS HBCC inverter was implemented with a fixed hysteresis band, which is a common technique in 3φ IPM motor drive systems. The output line-to-line voltage and the IPM motor line current were compared. The values of THD factors provided in Table II are obtained using the FLUKE™ 41 Power Harmonic Analyzer.

Next, the experimental performance of the 3φ 6-pulse VS WM inverter for supplying a 3φ Y—connected R-L linear load was compared to the performance of the symmetrical SVM inverter, implemented with a modulation index of 0.84 and a switching frequency of 1.8 kHz, under the same conditions. This experimental test was conducted for the inverter input DC voltage of 120 V.

Third, a non-linear load experimental test was conducted wherein the 3φ 6-pulse VS WM inverter supplied a 3φ full-wave diode rectifier with a resistive load of RL=70Ω. The test was performed for the inverter input DC voltage of 150 V. The collected line-toline voltage and load line current, along with their magnitude spectra were obtained using the Tektronix™ TDS 3014B digital oscilloscope. In order to highlight the performance of the 3φ WM inverter, the same 3φ diode rectifier with its RL=70Ω load was also supplied by a 3φ VS random pulse-width modulated (RPWM) inverter for the same input DC voltage of 150 V. The random pulse-width modulation technique used in this test is implemented with randomized carrier signal, a modulation index of 0.8, and a switching frequency of 1.8 kHz. The data show a consistently superior performance of the WM Inverter to the other state of the art methods, whether simulated or in practice.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

The invention claimed is:

1. A method for generating a set of switching signals for a three phase six pulse inverter, to produce output voltages and currents having a desired fundamental frequency, wherein a non-uniform recurrent sampling of reference modulating signals using three sets of scale-based linearly-combined wavelet basis functions and the set of switching signals are derived using three sets of synthesis non-dyadic wavelet basis functions that are dual to the scale-based linearly-combined wavelet basis functions used for the non-uniform recurrent sampling of the reference modulating signals.

2. The method of claim 1 wherein the set of switching signals is further comprised of switching pulses implemented without a carrier frequency as a reconstruction part of the non-dyadic multi-resolution analysis constructed by the three sets of scale-based linearly-combined wavelet basis functions and their dual wavelet basis functions.

3. The method of claim 2 wherein each set of the scale-based linearly-combined wavelet basis functions and their dual wavelet basis functions results in pulses whose start times, $t_{d1}$, a given leg of the three phase six pulse inverter, at step d, is given by $t_{d1}=d*T+2^{-(j+1)}$ and whose stop times, $t_{d2}$, on the same leg of the three phase six pulse inverter, at step d, is given by $(d+1)T-2^{-(j+1)}$, where T is a notional duration of a step and j is a scaling factor at step d.

4. The method of claim 3 wherein the scaling factor cycles from 1 to a scaling factor maximum and back to 1 over each half period of the fundamental frequency, and wherein the scaling factor maximum is 8 and the notional duration of a step, T, is the period of the fundamental frequency divided by 32 on each pulse.

5. The method of claim 4 wherein an initial scaling value for an "A" leg of the inventor is 1, an initial scaling value for a "B" leg of the inventor is 5 and an initial scaling value for a "C" leg of the inverter 6.

6. A method for generating a switching signal for a three phase six pulse inverter, having an "a" phase, a "b" phase and a "c" phase, to provide a set of desired output signals having a desired fundamental frequency, the method comprising:
   a. Determining a time step for the three phase six pulse inverter,
   b. Establishing a non-uniform recurrent sampling of the desired output signal based on a set of wavelet basis functions derived in association with the time step, the set of desired output signals and the desired fundamental frequency;
   c. Generating switching pulses using three synthesis scale-based linearly-combined scaling functions corresponding to the set of wavelet basis functions, according to the following steps:
      i. Initializing scales, an index of sample groups, and time counters for each of the "a" phase, the "b" phase and the "c" phase;
      ii. Creating an index of sample groups for each of the "a" phase, the "b" phase and the "c" phase based on the non-uniform recurrent sampling,
      iii. Applying the following routine:
         1. Increasing the scale for the "a" phase by 1, if the first derivative of the desired output signal on the "a" phase is positive at the end of the current sample group for the "a" phase;
         2. Decreasing the scale for the "a" phase by 1, if the first derivative of the desired output signal on the "a" phase is not positive at the end of the current sample group for the "a"phase;
         3. Increasing the scale for the "b" phase by 1, if the first derivative of the desired output signal on the "b" phase is positive at the end of the current sample group for the "b" phase;
         4. Decreasing the scale for the "b" phase by 1, if the first derivative of the desired output signal on the "b" phase is not positive at the end of the current sample group for the "b" phase;
         5. Increasing the scale for the "c" phase by 1, if the first derivative of the desired output signal on the "c" phase is positive at the end of the current: sample group for the "c" phase; and
         6. Decreasing the scale for the "c" phase by 1, the first derivative of the desired output signal on the "c"phase is not positive at the end of the current sample-group for the "c" phase;
      iv. Generating an ON pulse over the time interval of each sample group on each of the "a" phase, the "b" phase and the "c" phase;
      v. Applying the following routine:
         1. If the time counter of the "a" phase is greater than the period of the desired fundamental frequency, then set the scale of the "a" phase to 1 and set the current sample group of the "a" phase to the initial sample group within the index of sample groups for the "a" phase, otherwise set the current sample group of the "a" phase to the next sample group within the index of sample groups for the "a" phase;
         2. If the time counter of the "b" phase is greater than the 4/3 times the period of the desired fundamental frequency, then set the scale of the "b" phase to 1 and set the current sample group of the "b" phase to the initial sample group within the index of sample groups for the "b" phase, otherwise set the current sample group of the "b" phase to the next sample group within the index of sample groups for the "b" phase; and 3. If the time counter of the "c" phase is greater than the 5/3 times the period of the desired fundamental frequency, then set the scale of the "c" phase to 1 and set the current sample group of the "c" phase to the initial sample group within the index of sample groups for the "c" phase, otherwise set the current sample group of the "c" phase to the next sample group within the index of sample groups for the "c" phase;

vi. Increasing the time counter for each of the "a" phase, the "b" phase and the "c" phase by the time step; and vii. Returning to step ii.

\* \* \* \* \*